US010903727B2

United States Patent
Miyazaki et al.

(10) Patent No.: US 10,903,727 B2
(45) Date of Patent: Jan. 26, 2021

(54) STATOR CORE OF ROTARY ELECTRIC MACHINE

(71) Applicant: HONDA MOTOR CO., LTD., Tokyo (JP)

(72) Inventors: Shogo Miyazaki, Saitama (JP); Kazuyuki Ohta, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 27 days.

(21) Appl. No.: 16/260,437

(22) Filed: Jan. 29, 2019

(65) Prior Publication Data
US 2019/0245416 A1    Aug. 8, 2019

(30) Foreign Application Priority Data

Feb. 7, 2018    (JP) ................. 2018-020241

(51) Int. Cl.
*H02K 15/02*    (2006.01)
*H02K 1/16*    (2006.01)
(Continued)

(52) U.S. Cl.
CPC ........... *H02K 15/02* (2013.01); *H02K 1/16* (2013.01); *H02K 1/185* (2013.01); *B32B 15/011* (2013.01)

(58) Field of Classification Search
CPC .. H02K 1/00; H02K 1/16; H02K 1/18; H02K 1/185; H02K 15/00; H02K 15/02
See application file for complete search history.

(56) References Cited

U.S. PATENT DOCUMENTS 4,085,347 A * 4/1978 Lichius ............... H02K 1/16
174/DIG. 20
6,407,882 B1   6/2002 Katahara et al.
(Continued)

FOREIGN PATENT DOCUMENTS

CN    203883564 U    10/2014
JP    2000-163859 A    6/2000
(Continued)

OTHER PUBLICATIONS

Sep. 24, 2019, Japanese Office Action issued for related JP Application No. 2018-020241.

*Primary Examiner* — Tran N Nguyen
(74) *Attorney, Agent, or Firm* — Paralus Law Group, PLLC

(57) ABSTRACT

A stator core of a rotary electric machine includes a yoke portion which has an annular shape, plural tooth portions protruding radially from an inner peripheral edge of the yoke portion toward a center, and plural fastening portions protruding radially outward from an outer peripheral edge of the yoke portion and each formed with a fastening member insertion hole through which a fastening member is inserted. The stator core is configured by a plurality of electromagnetic steel plates laminated via an adhesive layer. The yoke portion includes plural fastening portion inner regions, and plural non-fastening portion inner regions. The adhesive layer is disposed on the yoke portion. The adhesive layer includes at least one first adhering portion provided in each of the fastening portion inner regions, and at least one second adhering portion provided in each of the non-fastening portion inner regions.

3 Claims, 5 Drawing Sheets

(51) Int. Cl.
*H02K 1/18* (2006.01)
*B32B 15/01* (2006.01)

(56) References Cited

U.S. PATENT DOCUMENTS

| | | |
|---|---|---|
| 2014/0084758 A1 | 3/2014 | Ochiai et al. |
| 2015/0354995 A1 | 12/2015 | Ochiai et al. |
| 2017/0271965 A1* | 9/2017 | Uda ........................ H02K 15/02 |
| 2017/0338724 A1* | 11/2017 | Arakawa ................ H02K 1/146 |

FOREIGN PATENT DOCUMENTS

| | | |
|---|---|---|
| JP | 2007-159300 A | 6/2007 |
| JP | 2007-181292 A | 7/2007 |
| JP | 2016-140134 A | 8/2016 |
| JP | 2017-204980 A | 11/2017 |
| WO | WO 2017/141361 A1 | 8/2017 |

\* cited by examiner

STATOR CORE OF ROTARY ELECTRIC MACHINE

CROSS-REFERENCE TO RELATED APPLICATIONS

The present application claims the benefit of priority of Japanese Patent Application No. 2018-020241, filed on Feb. 7, 2018, the content of which is incorporated herein by reference.

TECHNICAL FIELD

The present invention relates to a stator core of a rotary electric machine, and particularly, to a stator core of a rotary electric machine which is configured by a plurality of laminated electromagnetic steel plates.

BACKGROUND ART

There has been known a stator core of a rotary electric machine configured by laminating a plurality of electromagnetic steel plates. In such a stator core, for example, JP-A-2007-159300 and JP-A-2017-204980 disclose methods for fixing a plurality of laminated electromagnetic steel plates.

Specifically, JP-A-2007-159300 discloses a stator core of a rotary electric machine in which a plurality of laminated electromagnetic steel plates are fixed by crimping, with a press machine, crimping portions of the plurality of electromagnetic steel plates which are sequentially laminated.

JP-A-2017-204980 discloses a stator core of a rotary electric machine configured by laminated steel plates formed by laminating a plurality of annular plates (for example, an electromagnetic steel plate), in which adjacent annular plates are adhered with each other by an adhesive layer formed of an adhesive disposed on a back yoke portion and a tooth portion of the annular plate.

However, in the stator core of the rotary electric machine as described in JP-A-2007-159300 in which the plurality of electromagnetic steel plates are fixed by crimping, loss may occur due to conduction between the electromagnetic steel plates at the crimping portions.

In the stator core of the rotary electric machine as described in JP-A-2017-204980 in which the plurality of electromagnetic steel plates are fixed by the adhesive layer formed of the adhesive disposed on the back yoke portion and the tooth portion, no loss occurs due to conduction between the electromagnetic steel plates, but a holding force between the electromagnetic steel plates is larger than that in fixing by crimping, so that the rigidity of the stator core is higher. Therefore, when a rotor of the rotary electric machine rotates, a vibratory force caused by a reactive force (magnetic attraction force, torque ripple or the like) generated between a stator and the rotor is easily transferred to a casing of the rotary electric machine via the stator core, and thus, noise and vibration characteristics (hereinafter referred to as "NV characteristics") of the rotary electric machine would deteriorate.

SUMMARY

Accordingly, an aspect of the present invention provides a technique capable of reducing or preventing deterioration of NV characteristics in a stator core of a rotary electric machine which is configured by a plurality of electromagnetic steel plates laminated via an adhesive layer.

According to an embodiment of the present invention, there is provided a stator core of a rotary electric machine including:

a yoke portion which has an annular shape;

a plurality of tooth portions which are protruding radially from an inner peripheral edge of the yoke portion toward a center and are formed at equal intervals in a circumferential direction of the yoke portion; and a plurality of fastening portions which are protruding radially outward from an outer peripheral edge of the yoke portion and each of which is formed with a fastening member insertion hole through which a fastening member is inserted, wherein the stator core is configured by a plurality of electromagnetic steel plates laminated via an adhesive layer, wherein the yoke portion includes:

a plurality of fastening portion inner regions, each of which is a region located between straight lines connecting the center and both circumferential end portions of respective one of the fastening portions; and a plurality of non-fastening portion inner regions, each of which is a region located between respective adjacent fastening portion inner regions, wherein the adhesive layer is disposed on the yoke portion, and wherein the adhesive layer includes at least one first adhering portion provided in each of the fastening portion inner regions, and at least one second adhering portion provided in each of the non-fastening portion inner regions.

Effects of the Invention

According to the above configuration, the adhesive layer is disposed on the yoke portion and includes at least one first adhering portion provided in each of the fastening portion inner regions, and at least one second adhering portion provided in each of the non-fastening portion inner regions, so that adjacent electromagnetic steel plates can be reliably fixed with each other in the fastening portion inner regions and the non-fastening portion inner regions of the yoke portion. Further, when a rotor of the rotary electric machine rotates, even if the tooth portion vibrates due to the vibratory force caused by a reactive force (magnetic attraction force, torque ripple or the like) generated between the stator and the rotor, the vibration can be mainly received by the first adhering portion located in a transferring path of the vibration to the fastening portion. Therefore, the vibratory force can be restrained from transferring to the fastening portion, and the vibratory force can be restrained from transferring to the housing of the rotary electric machine through the fastening member from the fastening portion. Accordingly, the deterioration of the NV characteristics of the rotary electric machine can be reduced or prevented.

DESCRIPTION OF EMBODIMENTS

Hereinafter, a stator core of a rotary electric machine according to an embodiment of the present invention will be described with reference to FIGS. 1 to 5.

<Stator Core>

Figure 1:
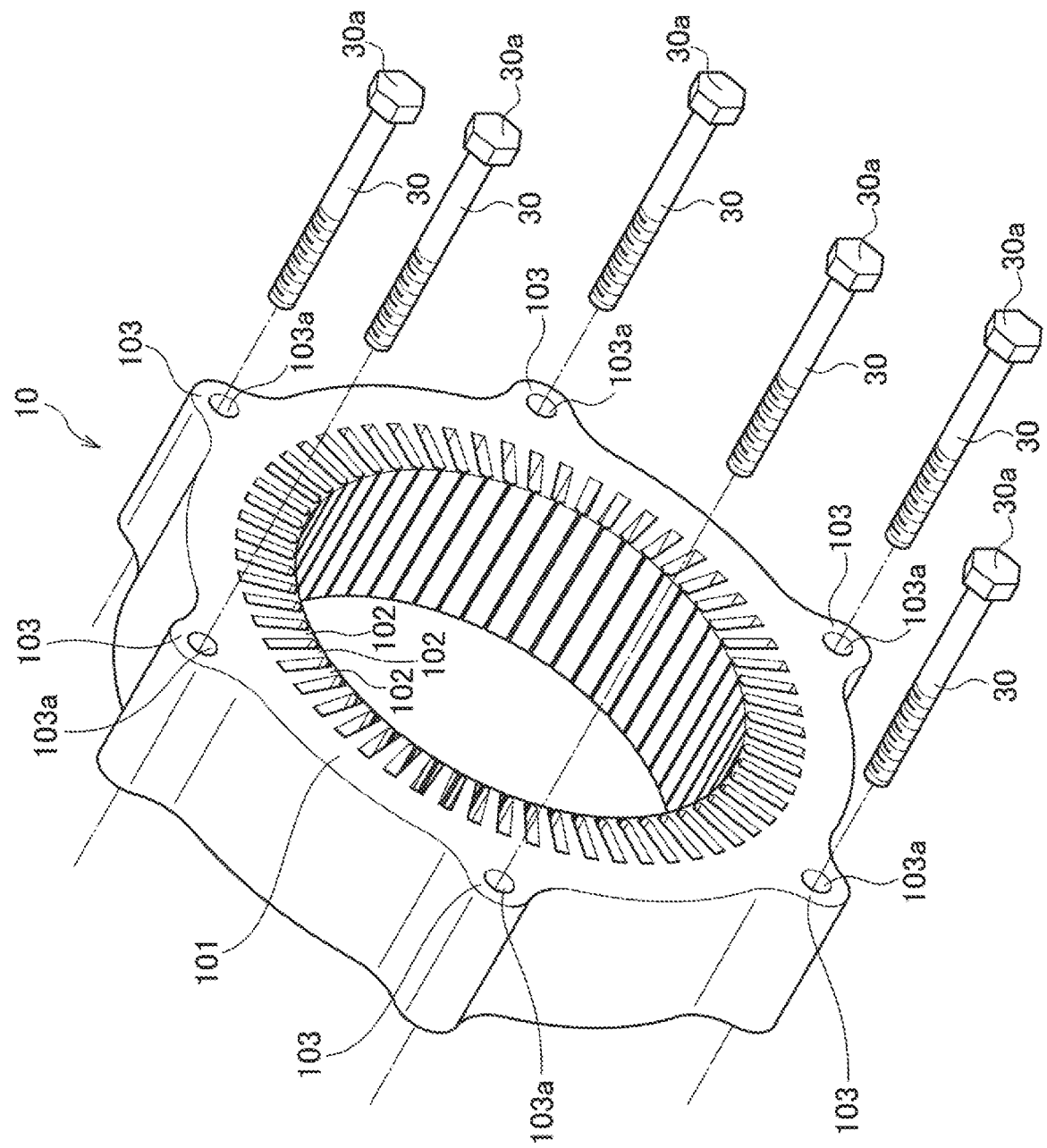
FIG. 1 is an exploded perspective view of a stator core of a rotary electric machine according to an embodiment of the present invention.
Figure 2:
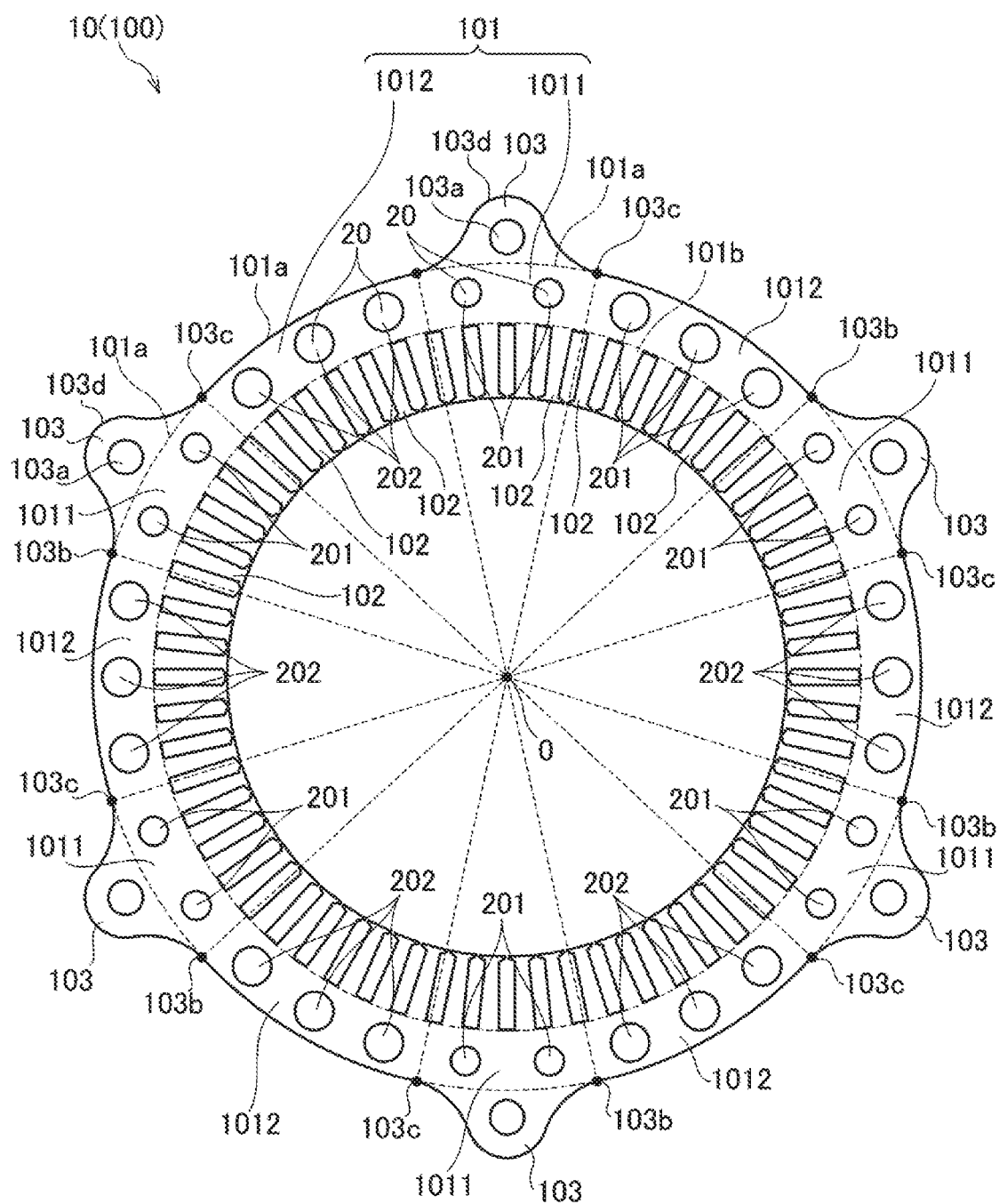
FIG. 2 is a plan view of an electromagnetic steel plate and an adhesive layer of the stator core of the rotary electric machine in FIG. 1.

As shown in FIGS. 1 and 2, a stator core 10 of a rotary electric machine includes an annular-shaped yoke portion 101, a plurality of tooth portions 102 which protrude radially from an inner peripheral edge 101b of the yoke portion 101 toward a center O and are formed at equal intervals in a circumferential direction of the yoke portion 101, and a plurality of (six in the illustrated embodiment) fastening portions 103 which protrudes radially outward from an outer peripheral edge 101a of the yoke portion 101. The stator core 10 is configured by laminating a plurality of electromagnetic steel plates 100 (see FIG. 4) having the same shape.

In the plurality of laminated electromagnetic steel plates 100, adjacent electromagnetic steel plates 100 are joined together as a whole by adhesive layers 20.

A bolt insertion hole 103a is formed in each of the fastening portions 103 of the stator core 10, and through which a bolt 30 is inserted so as to penetrate in a thickness direction of the stator core 10. The bolt 30 is inserted through the bolt insertion hole 103a and screwed into a housing (not shown) and holds the stator core 10 between a bolt head 30a and the housing by an axial force, so that the stator core 10 is fixed to the housing.

<Electromagnetic Steel Plate and Adhesive Layer>

Figure 3:
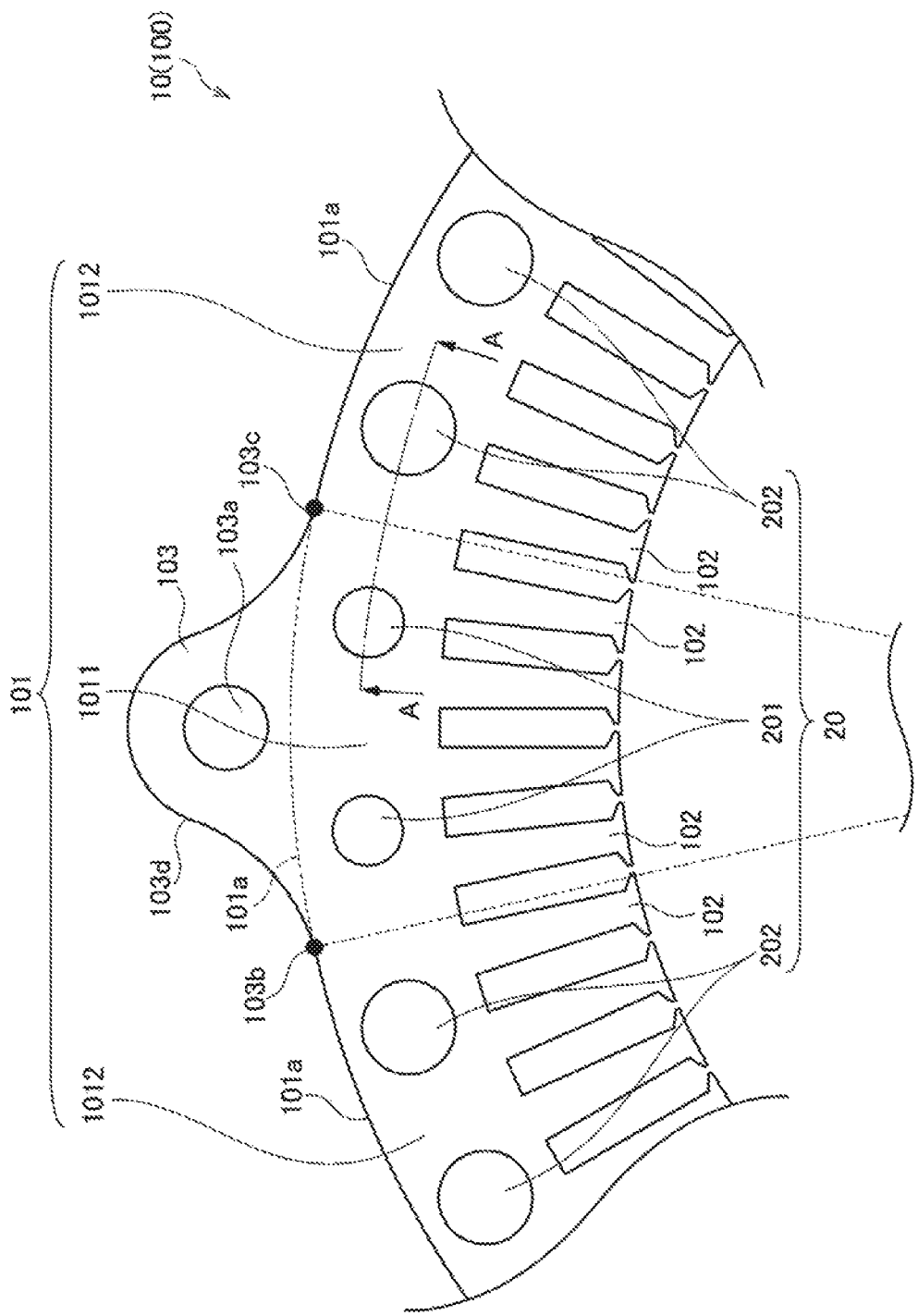
FIG. 3 is a partial enlarged view of FIG. 2.

As shown in FIGS. 2 and 3, the yoke portion 101 of the electromagnetic steel plate 100 has an annular shape in which the outer peripheral edge 101a and the inner peripheral edge 101b are concentric circles with the center O.

In the plan view, the yoke portion 101 includes fastening portion inner regions 1011 and non-fastening portion inner regions 1012 as the same number as the fastening portions 103 (six in the illustrated embodiment). The fastening portion inner region 1011 is a region located (sandwiched) between straight lines connecting the center O and both circumferential end portions 103b, 103c of the fastening portion 103. The non-fastening portion inner region 1012 is a region located (sandwiched) between the adjacent fastening portion inner regions 1011. Here, the circumferential end portions 103b, 103c of the fastening portion 103 are contact points between the circular outer peripheral edge 101a and an outer peripheral edge 103d of the fastening portion 103 respectively.

The adhesive layers 20 provided between the plurality of laminated electromagnetic steel plates 100 are disposed on the surface of the yoke portion 101 and not disposed on the surfaces of the tooth portions 102 and the fastening portions 103. The adhesive layer 20 includes first adhering portions 201 provided in each fastening portion inner region 1011 and second adhering portions 202 provided in each non-fastening portion inner region 1012.

Both of the first adhering portion 201 and the second adhering portion 202 are substantially circular in shape. Specifically, two first adhering portions 201 are provided in each fastening portion inner region 1011, and three second adhering portions 202 are provided in each non-fastening portion inner region 1012. The area of the second adhering portion 202 is larger than the area of the first adhering portion 201.

A total area of the first adhering portions 201 and second adhering portions 202 disposed in the yoke portion 101 of the electromagnetic steel plate 100 is equal to or less than half of a total area of the yoke portion 101. Specifically, the total area of the first adhering portions 201 and the second adhering portions 202 is 10% to 25% of the total area of the yoke portion 101.

Here, when the rotor of the rotary electric machine disposed at an inner diameter side of the stator core 10 rotates, a vibratory force caused by a reactive force (magnetic attraction force, torque ripple or the like) generated between the stator and the rotor is generated in the tooth portion 102 of the stator core 10. The vibratory force vibrates the tooth portion 102 of the stator core 10, and the vibration is transferred to the fastening portion 103 via the fastening portion inner region 1011 of the yoke portion 101 as a transferring path and then transferred to the housing via the bolt 30, so that the rotary electric machine vibrates.

According to the present embodiment, the adhesive layer 20 is disposed in the yoke portion 101 and includes the first adhering portions 201 provided in each fastening portion inner region 1011 and the second adhering portions 202 provided in each non-fastening portion inner region 1012. Accordingly, when the rotor of the rotary electric machine rotates, even if the tooth portion 102 vibrates due to the vibratory force caused by the reactive force generated between the stator and the rotor, the vibration can be mainly received by the first adhering portion 201 located in the fastening portion inner region 1011 which is the transferring path of the vibration to the fastening portion 103. Therefore, the vibratory force can be restrained from transferring to the fastening portion 103, and the vibratory force can be restrained from transferring to the housing of the rotary electric machine through the bolt 30 from the fastening portion 103. That is, since the vibration of the rotary electric machine is restrained, the deterioration of the NV characteristics of the rotary electric machine can be reduced or prevented.

When the plurality of laminated electromagnetic steel plates 100 are clamped to the housing of the rotary electric machine by the bolt 30, distortion may occur in the electromagnetic steel plates 100 due to the axial force of the bolt 30, and the axial force of the bolt 30 may become unstable. This becomes more serious as a gap between adjacent electromagnetic steel plates 100 in the vicinity of the fastening portion 103 becomes larger.

According to the present embodiment, the first adhering portions 201 are provided on the fastening portion inner region 1011 located in the vicinity of the fastening portion 103, so that the adhesive layer 20 is interposed in a part of the gap between adjacent electromagnetic steel plates 100, and distortion of the electromagnetic steel plates 100 due to the axial force of the bolt 30 is restrained. Accordingly, the axial force of the bolt 30 is stabilized, so that the stator core 10, the housing, and the plurality of laminated electromagnetic steel plates 100 can be more firmly fixed.

The influence of the axial force of the bolt 30 is small in the non-fastening portion inner region 1012 located away from the fastening portion 103. That is, in the non-fastening portion inner region 1012 located away from the fastening portion 103, the plurality of laminated electromagnetic steel plates 100 are held substantially only by the joining force of the second adhering portions 202.

According to the present embodiment, the area of the second adhering portions 202 provided in the non-fastening portion inner region 1012 is larger than the area of the first adhering portions 201 provided in the fastening portion inner region 1011, so that a large joining force can be obtained from the second adhering portions 202 having a large area in the non-fastening portion inner region 1012 where the influence of the axial force of the bolt 30 is smaller, and the plurality of laminated electromagnetic steel plates 100 can be more effectively fixed. Further, the second adhering portions 202 are provided in the non-fastening portion inner region 1012 which is the region not in the transferring path of the vibratory force to the fastening portion 103, so that the plurality of laminated electromagnetic steel plates 100 can be more firmly joined while restraining the vibratory force from being transferred to the fastening portion 103.

In FIGS. 2 and 3, two first adhering portions 201 are provided in each fastening portion inner region 1011, and three second adhering portions 202 are provided in each non-fastening portion inner region 1012, but the present invention is not limited thereto as long as at least one first adhering portion 201 is provided in each fastening portion inner region 1011, and at least one second adhering portion 202 is provided in each non-fastening portion inner region 1012. Further, the number of the first adhering portion 201 and the second adhering portion 202 may be the same or different. Further, the shapes of the first adhering portion 201 and the second adhering portion 202 are substantially circular in the drawings, but the shapes of the first adhering portion 201 and the second adhering portion 202 may be any shapes such as an oval shape or a polygonal shape.

Figure 4:
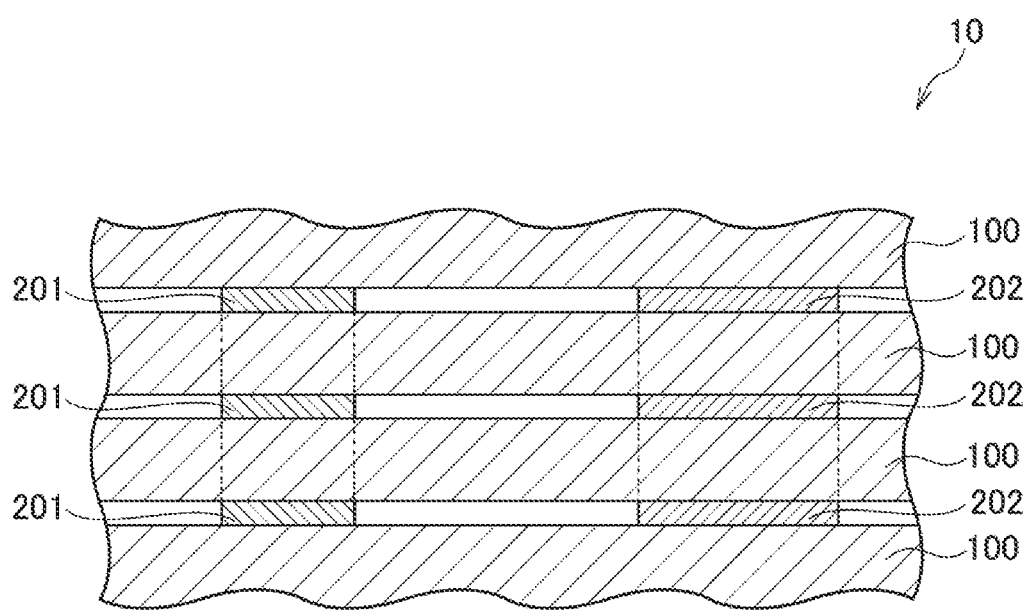
FIG. 4 is a sectional view taken along a line A-A in FIG. 3.

As shown in FIG. 4, between the plurality of laminated electromagnetic steel plates 100, the first adhering portions 201 and the second adhering portions 202 are provided in the same shape with the same area at the same position as seen in the lamination direction. Therefore, when manufacturing the stator core 10, there is no need to change the positions of the first adhering portion 201 and the second adhering portion 202, and it is sufficient to coat and apply the adhesive at the same positions so as to join and laminate the electromagnetic steel plates 100. Therefore, the stator core 10 can be easily manufactured.

Figure 5:
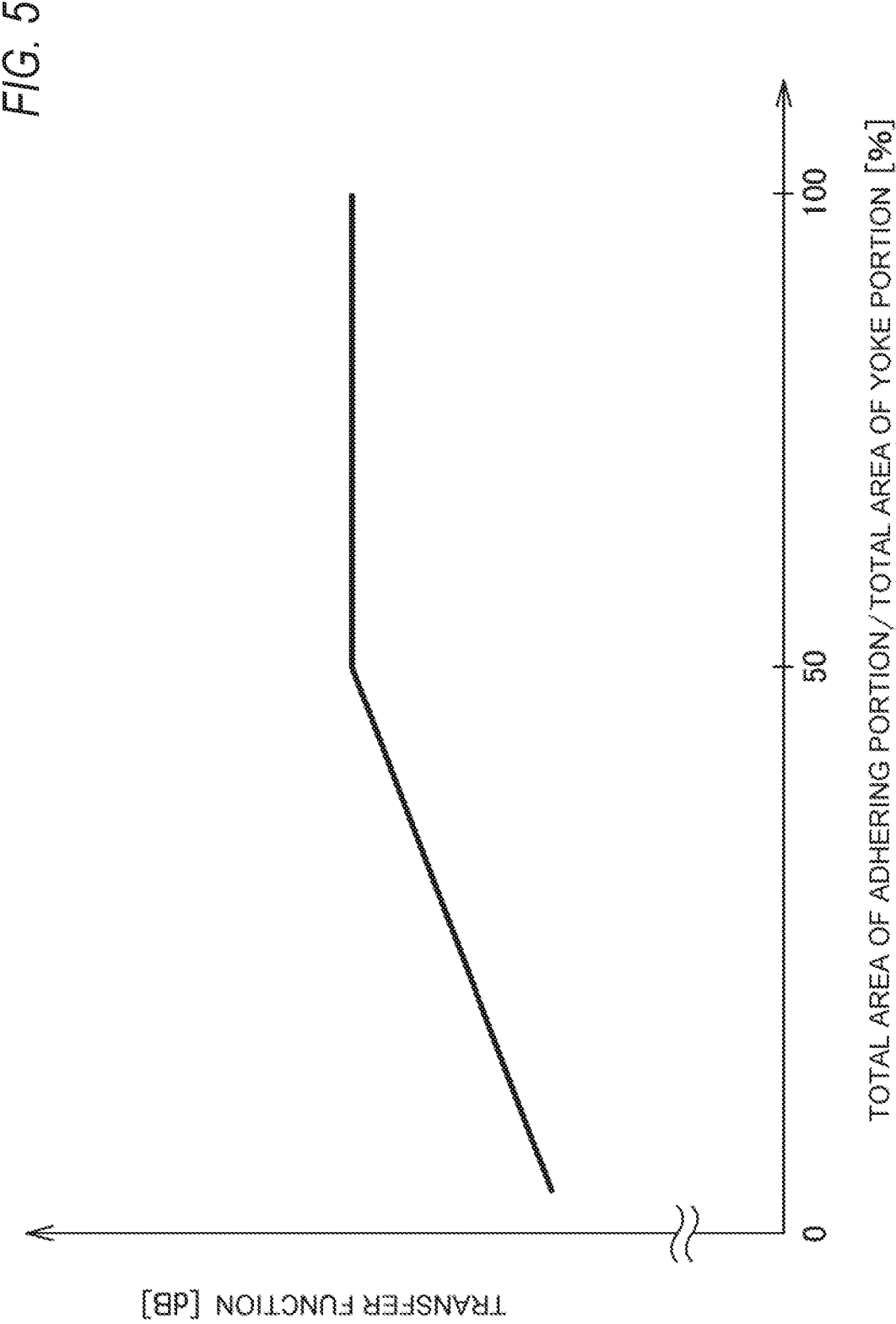
FIG. 5 is a graph showing a relationship between a transfer function of the stator core and a total area of an adhering portion in an embodiment of the present invention.

As shown in FIG. 5, when the total area of the adhering portion of the adhesive layer 20 disposed on the yoke portion 101 of the electromagnetic steel plate 100 is equal to or smaller than half of the total area of the yoke portion 101, the transfer function of the stator core 10 decreases as the total area of the adhering portion becomes smaller. That is, when the total area of the adhering portion of the adhesive layer 20 disposed on the yoke portion 101 of the electromagnetic steel plate 100 is equal to or smaller than half of the total area of the yoke portion 101, the holding force between adjacent electromagnetic steel plates 100 decreases as the total area of the adhering portion becomes smaller. Accordingly, the rigidity of the stator core 10 is lowered, and the vibratory force is restrained from being transferred to the adjacent electromagnetic steel plate 100 via the adhesive layer 20.

According to the present embodiment, the total area of the first adhering portions 201 and the second adhering portions 202 is equal to or smaller than half of the total area of the yoke portion 101, so that the rigidity of the stator core 10 is not high and the vibratory force is restrained from being transferred to the adjacent electromagnetic steel plate 100 via the adhesive layer 20. Accordingly, the NV characteristics due to the stator core 10 are improved, so that the deterioration of the NV characteristics of the rotary electric machine can be reduced or prevented.

Further, the total area of the first adhering portions 201 and the second adhering portions 202 may be 10% to 25% of the total area of the yoke portion 101, so that excellent NV characteristics can be obtained with are equal to or better than that of the stator core of a rotary electric machine in which a plurality of electromagnetic steel plates are fixed by crimping while restraining distortion of the electromagnetic steel plate 100 due to the axial force of the bolt 30.

Incidentally, the above-described embodiment may be appropriately changed, modified, improved, or the like. For example, a part of the first adhering portion 201 and the second adhering portion 202 may be uneven. In this case, the contact area of the adhesive layer 20 with the electromagnetic steel plates 100 can be increased, and the plurality of laminated electromagnetic steel plates 100 can be more firmly held without increasing the area of the first adhering portions 201 in the plan view.

Further, at least the following subject matters are described in this specification. Although the corresponding constituent elements or the like in the above-described embodiment are shown in parentheses, the present invention is not limited thereto.

(1) A stator core (stator core 10) of a rotary electric machine includes:
  a yoke portion (yoke portion 101) which has an annular shape:
  a plurality of tooth portions (tooth portions 102) which are protruding radially from an inner peripheral edge (inner peripheral edge 101b) of the yoke portion toward a center (center O) and each of which is formed at equal intervals in a circumferential direction of the yoke portion; and
  a plurality of fastening portions (fastening portion 103) which are protruding radially outward from an outer peripheral edge (101a) of the yoke portion and each of which is formed with a fastening member insertion hole (bolt insertion hole 103a) through which a fastening member (bolt 30) is inserted,
  wherein the stator core is configured by a plurality of electromagnetic steel plates (electromagnetic steel plate 100) laminated via an adhesive layer (adhesive layer 20),
    wherein the yoke portion includes:
      a plurality of fastening portion inner regions (fastening portion inner region 1011), each of which is a region located between straight lines connecting the center and both circumferential end portions (both peripheral end portions 103b, 103c) of respective one of the fastening portions; and
      a plurality of non-fastening portion inner regions (non-fastening portion inner region 1012), each of which is a region located between respective adjacent fastening portion inner regions,
    wherein the adhesive layer is disposed on the yoke portion, and
    wherein the adhesive layer includes at least one first adhering portion (first adhering portion 201) provided in each of the fastening portion inner regions, and at least one second adhering portion (second adhering portion 202) provided in each of the non-fastening portion inner regions.

According to (1), the adhesive layer is disposed on the yoke portion and includes at least one first adhering portion provided in each of the fastening portion inner regions, and at least one second adhering portion provided in each of the non-fastening portion inner regions, so that adjacent electromagnetic steel plates can be reliably fixed with each other in the fastening portion inner regions and the non-fastening portion inner regions of the yoke portion. Further, when a rotor of the rotary electric machine rotates, even if the tooth portion vibrates due to the vibratory force caused by a reactive force (magnetic attraction force, torque ripple or the like) generated between the stator and the rotor, the vibration can be mainly received by the first adhering portion located in the transferring path of the vibration to the fastening portion. Therefore, the vibratory force can be restrained from transferring to the fastening portion, and the vibratory force can be restrained from transferring to the case of the rotary electric machine through the fastening member from the fastening portion. Accordingly, the deterioration of the NV characteristics of the rotary electric machine can be reduced or prevented. Further, when the plurality of laminated electromagnetic steel plates are fastened by the fastening member, the distortion of the electromagnetic steel plate due to the axial force of the fastening member can be restrained by the first adhering portions located in the vicinity of the fastening portion. Therefore, the axial force of the fastening member is stabilized, and the plurality of laminated electromagnetic steel plates are more firmly fastened.

(2) In the stator core according to (1),
an area of the second adhering portion may be larger than an area of the first adhering portion.

According to (2), the area of the second adhering portion is larger than the area of the first adhering portion, so that adjacent electromagnetic steel plates can be more firmly joined in the non-fastening portion inner regions which are the regions not in the transferring path of the vibratory force to the fastening portion and where the influence of the axial force of the fastening member is smaller.

(3) In the stator core according to (1) or (2),
the first adhering portion and the second adhering portion may be provided at same positions in a lamination direction.

According to (3), the first adhering portion and the second adhering portion are provided at the same positions in the lamination direction, so that when manufacturing the stator core, there is no need to change the positions of the first adhering portion and the second adhering portion, and it is sufficient to coat and apply the adhesive at the same positions so as to join and laminate the electromagnetic steel plates. Therefore, the stator core can be easily manufactured.

(4) In the stator core according to any one of (1) to (3), a total area of the first adhering portions and the second adhering portions on a surface of an electromagnetic steel plate may be equal to or smaller than half of a total area of the yoke portion.

According to (4), the total area of the first adhering portions and the second adhering portions on the surface of the electromagnetic steel plate is equal to or smaller than half of the total area of the yoke portion, so that the rigidity of the stator core is not high and the vibratory force is restrained from being transferred to the adjacent electromagnetic steel plate via the adhesive layer.

The invention claimed is:

1. A stator core of a rotary electric machine, comprising:
a yoke portion which has an annular shape;
a plurality of tooth portions which are protruding radially from an inner peripheral edge of the yoke portion toward a center and are formed at equal intervals in a circumferential direction of the yoke portion; and
a plurality of fastening portions which are protruding radially outward from an outer peripheral edge of the yoke portion, each of the plurality of fastening portions being formed with a fastening member insertion hole through which a fastening member is inserted,
wherein the stator core is configured by a plurality of electromagnetic steel plates laminated via an adhesive layer,
wherein the yoke portion includes:
a plurality of fastening portion inner regions, each of which is a region located between straight lines connecting the center and both circumferential end portions of respective one of the fastening portions; and
a plurality of non-fastening portion inner regions, each of which is a region located between respective adjacent fastening portion inner regions,
wherein the adhesive layer is disposed on the yoke portion,
wherein the adhesive layer includes at least one first adhering portion provided in each of the fastening portion inner regions, and at least one second adhering portion provided in each of the non-fastening portion inner regions, and
wherein an area of the second adhering portion is larger than an area of the first adhering portion, the at least one first adhering portion and the at least one second adhering portion being configured so as to provide a larger joining force within the plurality of non-fastening portion inner regions which are regions not in a direct transferring path of vibratory force to the plurality of fastening portions, as compared to a joining force within the plurality of fastening portion inner regions.

2. The stator core according to claim 1,
wherein the first adhering portion and the second adhering portion are provided at same positions in a lamination direction.

3. The stator core according to claim 1,
wherein a total area of the first adhering portions and the second adhering portions on a surface of an electromagnetic steel plate is equal to or smaller than half of a total area of the yoke portion.

* * * * *